March 20, 1956 H. C. SPAHN 2,738,980
EXPANSIBLE ARBORS
Filed March 20, 1953
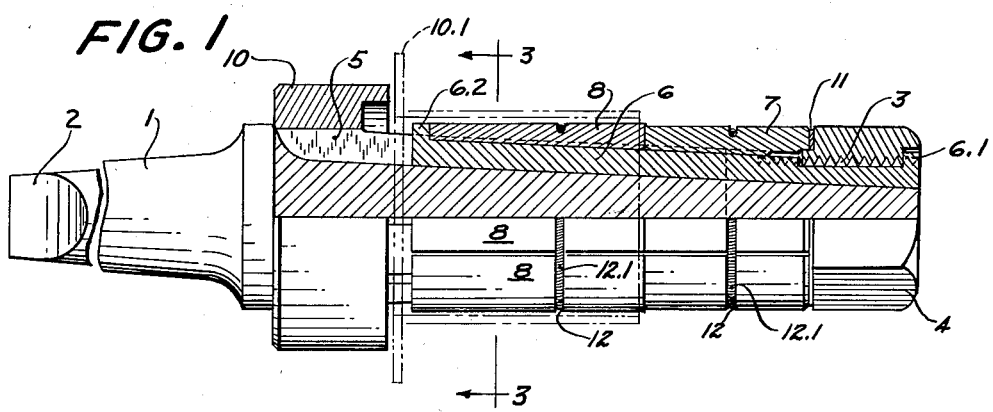
FIG. 1
FIG. 2  FIG. 3
FIG. 4  FIG. 5
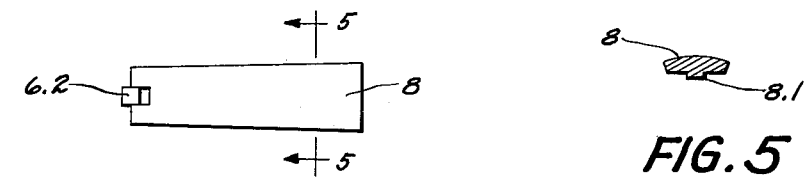
Hilbert C. Spahn, INVENTOR,
BY Bush + Bush,
ATTORNEYS.

United States Patent Office 2,738,980
Patented Mar. 20, 1956

2,738,980

EXPANSIBLE ARBORS

Hilbert C. Spahn, Kewanee, Ill.

Application March 20, 1953, Serial No. 343,570

5 Claims. (Cl. 279—2)

My invention relates to arbors for metal lathes of various kinds and similar machines.

The objects of my invention are to provide a strong arbor which will firmly hold various forms of metal pieces which are provided with a central bore while the outer parts thereof are to be subjected to cutting or grinding action of a lathe or milling machine whereby perfect positioning may be secured in the relation between the inner circumference of the bore and the outer periphery of the machined piece; to provide such an arbor upon which the pieces to be machined can be easily mounted and rigidly secured while being machined, as well as readily removed after being completed, to provide a form of arbor which can be made in various sizes to meet the requirements of different jobs and in which an arbor may be expanded or contracted for use with bores having a given range of different sizes.

I accomplish these objects by the means shown in the accompanying drawings, in which—

Figure 1 is a side quarter-sectional elevation of my arbor;

Figure 2 is an end view of the outer end;

Figure 3 is a cross-section on the line 3—3 of Figure 1;

Figure 4 is a detail of one of the sliding bars;

Figure 5 is a sectional view of a bar on the line 5—5 of Figure 4.

Similar numerals refer to similar parts throughout the several views.

My arbor includes a solid round bar 1 of steel or other suitable metal tapered slightly from the shank end to the middle and may be flattened at one end 2 to fit the tool holder of the lathe and prevent rotation of the arbor bar.

At the middle of the arbor bar I provide an enlarged flat ring 10 which may be integral with the bar or formed separately and united thereto by a pressfit or by welding or other suitable means.

The opposite end of the bar is reduced in diameter and has threads 3 to receive a nut 4. A portion of the nut is cut with an internal shoulder 6.1. The part of the bar between the ring 10 and the threads 3 is tapered and provided with a plurality of radial channels 5 preferably eight. Between the channels or grooves 5 the projecting sections 9 of the shaft or bar 1 have their outer angular faces flattened as shown in the drawings and tapered longitudinally to correspond with the taper of the shaft or bar 1.

Upon the angular faces of these intermediate sections 9 expansion bars 8 are mounted with their outer surfaces corresponding approximately to arcs of the inner circumference of the ring 10. These bars are formed with inwardly projecting ribs or splines 8.1 which extend a short distance into the channels 5.

Within the channels 5 retainer rods 6 are mounted having lugs or fingers 6.2 at the inner ends thereof which seat in notches formed in the inner ends of the bars. The outer ends of the retainers have similar lugs or fingers 6.1 formed thereon which are engaged by the shoulder ring in the nut 4.

These retainers thus act to restrict the expansion of the bars when the nut is unscrewed or moved outwardly upon the threaded portion 3 of the bar 1.

In order to drive the expansion bars inwardly along the sloping sections 9 and thus expand them, driving bars 7 are slidably mounted upon the threaded portion of the bar 1 with their inner ends resting upon a reduced circumferential ring of the bar between the expansion bars and the nut or a washer 11 which may be interposed between the outer ends of the driving bars and the nut.

When the nut is tightened or screwed up upon its threads, the driving bars will exert pressure upon the expansion bars to drive them inwardly along the sloping sections thereby expanding said bars.

In the operation of this arbor the nut 4 is turned outwardly to carry the expansion bars outwardly along the sloping sections, thereby reducing the diameter of the periphery thereof enough to permit the bore of the piece to be machined to be mounted by passing over the nut and placed upon the arbor. The nut is then tightened and the expansion bars forced into contact with the inner circumference of the bore whereby the piece will be readily held against slipping either lonigtudinally or circumferentially.

In order to retain the expansion bars and the driving bars in their places, circumferential grooves 12–12 are formed therein and coiled springs 12.1 are mounted in the grooves to exert pressure inwardly upon the bars at all times. My arbor may be arranged to hold different sized pieces or parts to be operated on by the lathe, either by increasing the dimensions of all the parts or by increasing the thickness of the part 8 as shown in Figure 5.

It will be noted that the threads 3 are formed upon the reduced right end of the bar or shaft 1 and cooperate with similar threads formed upon the inner circumference of the nut 4. No threads are formed upon the retainer rods or strips 6, but they are free to slide either in or out as controlled by the lugs or fingers which contact the annular shoulder 6.1 at the outer ends thereof or the lugs or fingers 6.2 at the inner ends of the retainer strips 6.

When the nut 4 is screwed inwardly upon the threads 3, the washer 11 is forced against the outer end of the driving bars 7 and they in turn drive the expansion bars 8 along the upward slope of the bar or shaft 1 and are thereby expanded against a workpiece mounted thereon.

The outer ends of the retainer rods or strips 6 are reduced in size so as to clear the threads 3 of the nut 4 and allow the nut and expansion bars or plates to move longitudinally of the bar or shaft 1, except as restrained by the lugs 6.2 and the shoulder 6.1.

Various changes may be made in the sizes, dimensions and proportions of the parts without departing from the spirit of my invention as expressed in the claims and I do not limit my claim to the precise forms shown in the drawings.

I claim:

1. The combination in an arbor for metal lathes, of a longitudinal central bar tapered from an enlarged circular midsection of the bar and having one end adapted to fit the chuck of a lathe and its free end reduced in diameter and fitted with spiral threads, a plurality of longitudinal channels extending from the enlarged portion to and through the threaded end of the central bar between and in alternation with the channels and sloping inwardly from the midsection to the threaded end, each rib having a pair of flat laterally inclined faces at its outer edge, a corresponding plurality of expansion bars each slidably mounted upon the nearest lateral faces of two successive ribs, and adapted to expand as they are driven toward the enlarged midsection to afford a firm grip upon an annular workpiece mounted upon the arbor, an adjustable nut mounted upon the threaded end of the central bar arranged to operate a plurality of driving bars corresponding in number to the expansion bars and mounted upon the ribs adjacent the nut having their inner ends bearing against the adjacent end of the expansion bars and their outer ends in contact with the nut whereby the expansion bars will be driven inwardly along the ribs when the nut is turned inwardly upon the threads and may move outwardly when the nut is retracted, the sets of expansion bars and driving bars having intermediate circumferential grooves formed therein with coiled tension springs seated in the grooves adapted to retain the bars from displacement.

2. In an arbor for metal lathes including a longitudinal central bar tapered from an enlarged circular midsection of the bar and having one end reduced in diameter and fitted with spiral threads, a plurality of longitudinal channels extending from the enlarged portion to and through the threaded end of the central bar between and in alternation with the channels and sloping inwardly from the midsection to the threaded end, each rib having a pair of flat laterally inclined faces at its outer edge, a corresponding plurality of expansion bars each slidably mounted upon the nearest lateral faces of two successive ribs, and adapted to expand as they are driven toward the enlarged midsection to afford a firm grip upon an annular workpiece mounted upon the arbor, an adjustable nut mounted upon the threaded end of the central bar arranged to operate a plurality of driving bars corresponding in number to the expansion bars and mounted upon the ribs adjacent the nut with their inner ends bearing against the adjacent ends of the expansion bars and their outer ends in contact with the nut whereby the expansion bars will be driven inwardly along the ribs when the nut is turned inwardly upon the threads and may move outwardly when the nut is retracted, the expansion bars having longitudinal splines thereon projecting into their respective channels, and being movable outwardly by retainer strips mounted in the channels, each having a finger upon its inner end in engagement with the inner end of its associate expansion bar and adapted to move the expansion bars downwardly along the sloping ribs when the strips are moved outwardly by the nut when retracted by contact of fingers upon the outer ends of the strips with a circular shoulder formed in the nut whereby the retainer strips will be moved outwardly along the ribs when the nut is turned outwardly.

3. An arbor for metal lathes, including a central longitudinal arbor bar adapted to have one end held in the chuck of a lathe and having its free end portion tapered with the outer reduced portion spirally threaded, a plurality of uniform flat-bottomed channels with parallel sides extending along the tapered part of the bar and to and through the threaded end portion thereof, corresponding intermediate upstanding ribs integral with the central bar between the channels, each rib having two flat lateral faces extending the full length thereof at its outer edge to afford a support for expansion bars and for driving bars all mounted upon the ribs with inward longitudinal splines extending into and slidable in their respective channels, each expansion bar and each driving bar being slidable upon the nearest lateral faces of two successive ribs, retainer strips slidably mounted in the channels attached at their ends to the inner ends of the expansion bars and with their outer ends engaged by a nut adjustably mounted upon the threaded end of the central arbor bar adapted to actuate the driving bars inwardly when advanced and to draw the retainer strips outwardly when retracted.

4. An arbor as described in claim 3, the sets of expansion bars and driving bars having circumferential grooves cut therein with coiled tension springs seated in the grooves to retain them from displacement.

5. An arbor for metal lathes including a central longitudinal arbor bar adapted to be held in a chuck with its free end tapered and having a reduced spirally threaded outer end, a plurality of uniform longitudinal channels extending along the tapered part of the bar and the threaded end thereof, upstanding intermediate sections of the bar between the adjacent channels and sloping to the threaded portion of the bar each intermediate section having two lateral outer faces flattened and standing at an angle to each other, a plurality of expansion bars each slidably mounted on the lateral faces of the two upstanding sections adjacent thereto, the outer faces of the expansion bars being formed on arcs similar to the circumference of a circle, a nut mounted upon the threaded end of the arbor bar, driving bars mounted upon the upstanding sections near the threaded end of the arbor bar with their inner ends bearing against the outer ends of the expansion bars respectively and their outer ends adapted to be contacted and moved inwardly by rotation of the nut, the sets of expansion bars and driving bars having circumferential grooves formed therein with resilient means seated therein to retain them from displacement.

References Cited in the file of this patent

UNITED STATES PATENTS

| 122,920 | Simons | Jan. 23, 1872 |
| 189,483 | McNair | Apr. 10, 1877 |
| 291,282 | Blue | Jan. 1, 1884 |
| 447,667 | Dubrule | Mar. 3, 1891 |
| 714,448 | Bryan | Nov. 25, 1902 |
| 1,588,787 | Waterman | June 15, 1926 |
| 1,902,176 | Miner | Mar. 21, 1933 |
| 2,392,259 | Palotsee | Jan. 1, 1946 |

FOREIGN PATENTS

| 40,670 | Switzerland | Dec. 6, 1907 |
| 451,389 | Germany | Oct. 21, 1927 |